United States Patent [19]
Penninckx et al.

[11] Patent Number: 6,002,816
[45] Date of Patent: Dec. 14, 1999

[54] OPTICAL DATA EMITTER DEVICE

[75] Inventors: Denis Penninckx, Montlhery; Philippe Delansay, Paris, both of France

[73] Assignee: Alcatel, Paris, France

[21] Appl. No.: 08/977,494

[22] Filed: Nov. 24, 1997

[30] Foreign Application Priority Data

Nov. 28, 1996 [FR] France ................................. 96 14584

[51] Int. Cl.[6] ................................................ G02B 6/26
[52] U.S. Cl. ....................................... 385/3; 385/2
[58] Field of Search ............................................. 385/1–3

[56] References Cited

U.S. PATENT DOCUMENTS

| 4,689,759 | 8/1987 | Anouar et al. | 364/572 |
| 5,359,449 | 10/1994 | Nishimoto et al. | 359/181 |
| 5,524,076 | 6/1996 | Rolland et al. | 385/8 |
| 5,655,034 | 8/1997 | Ishizaka et al. | 385/3 |
| 5,694,504 | 12/1997 | Yu et al. | 385/45 |

FOREIGN PATENT DOCUMENTS

| 2302738 | 1/1997 | United Kingdom . |
| WO9529539 | 11/1995 | WIPO . |

OTHER PUBLICATIONS

K. Yonenaga et al, "Optical Duobinary Transmisison System with No Receiver Sensitivity Degradation", Electronics Letters, Feb. 16, 1995, UK, vol. 31, No. 4, ISSN 0013–5194, pp. 302–304.

J. Yu et al, "Phase–engineered III–V–MQW Mach–Zehnder Modulators", IEEE Photonics Technology Letters, Aug. 1996, IEEE, USA, vol. 8, No. 8, ISSN 1041–1135, pp. 1018–1020, XP000621639.

*Primary Examiner*—John D. Lee
*Assistant Examiner*—Victoria D. Hao
*Attorney, Agent, or Firm*—Sughrue, Mion, Zinn, Macpeak & Seas, PLLC

[57] ABSTRACT

In order to increase the distance over which binary data can be transmitted over an optical fiber, the device compensates for fiber-generated chromatic dispersion by modulating the emitted light wave both in power and in phase, in such a manner as to ensure that there is a phase shift of close to 180° within each binary cell for which the optical power is low but not zero. The device comprises a Mach-Zehnder type interferometer made on a substrate of III–V elements and designed so that in the absence of electrical voltages being applied to its electrodes it establishes destructive interference. A control circuit applies control voltages to the electrodes which voltages have DC components that are substantially equal, with at least one of the control voltages being the result of superposing a bias voltage on a filtered signal obtained by lowpass filtering an input electrical signal. The invention is applicable to long distance transmission over standard optical fibers.

8 Claims, 4 Drawing Sheets

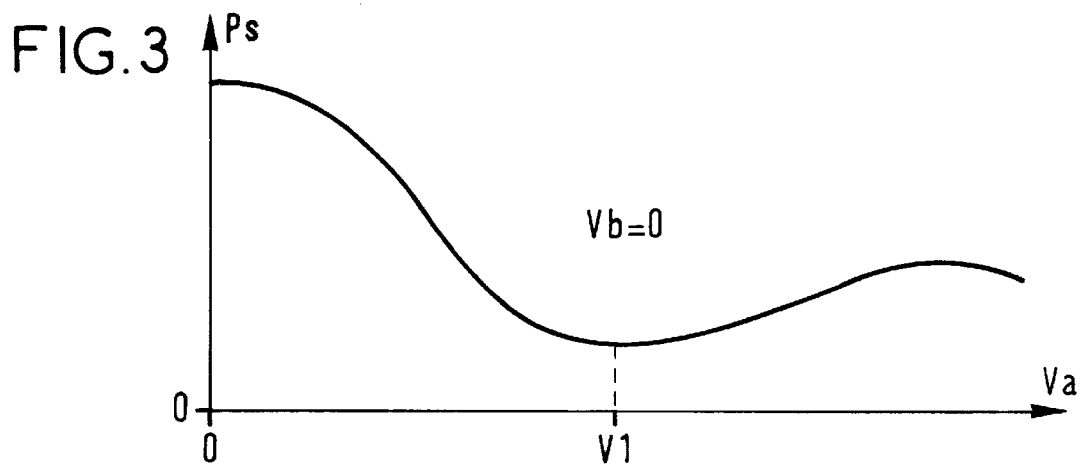
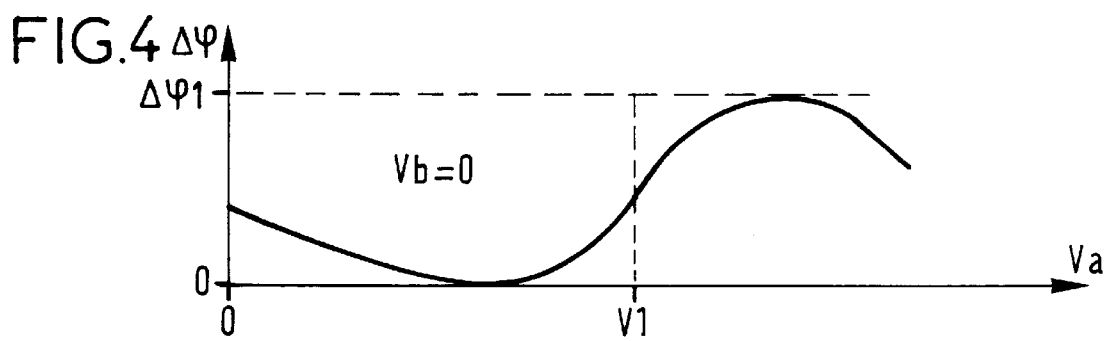
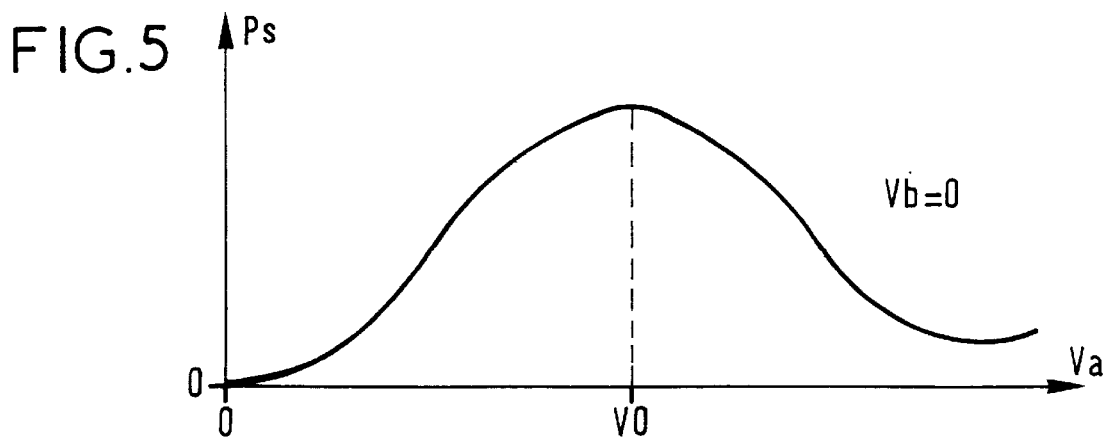
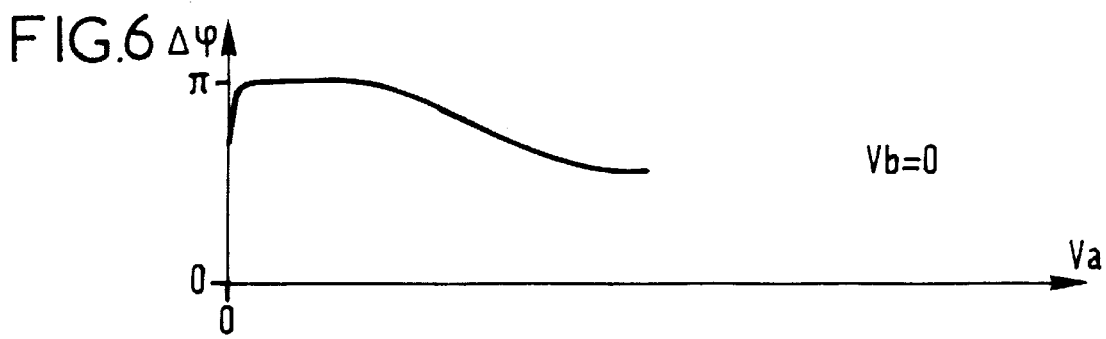

OPTICAL DATA EMITTER DEVICE

The invention lies in the field of digital data transmission by optical means. It relates more particularly to transmission at a high data rate over long distance links using optical fibers.

BACKGROUND OF THE INVENTION

Such transmission is performed by means of an optical emitter connected to an optical receiver by means of the fiber. The emitter uses an optical carrier wave and it modulates the power thereof as a function of the information to be transmitted. As a general rule, modulation consists in varying the power of the carrier wave between two levels: a low level corresponding to the wave being extinguished, and a high level corresponding to the maximum optical power of a laser oscillator. Conventionally, the low and high levels represent binary values "0" and "1", respectively. The variations in the level of the wave are triggered at instants that are imposed by a clock signal which thus defines successive time cells allocated to the data to be transmitted.

In general, the maximum transmission distance is limited by the ability of receivers to detect these two power levels without error after the modulated wave has propagated over the optical link. To increase this distance, attempts are generally made to increase the ratio between the mean high optical power level and the mean low optical power level, with this being referred to as the "extinction ratio" and constituting one of the characteristics of the modulation.

Also, for a given distance and a given extinction ratio, the data rate is limited by the chromatic dispersion generated within the fibers. This dispersion which results from the effective refractive index of the fiber depending on the wavelength of the wave it is conveying has the consequence of emitted pulses increasing in width as they propagate along the fiber.

To limit the consequences of that phenomenon, proposals have been made to reduce the spectrum band width of the signal to be transmitted by means of appropriate coding. In particular, proposals have been made to use "duobinary" code which is well known in the field of electrical transmission. This code has the property of halving the spectrum width of the signal. In this code, a three-level signal is used with the levels being symbolized respectively as 0, +, and –. Binary digit "0" is coded by level 0, while binary digit "1" is coded either by level + or by level –, using the coding rule whereby the levels coding two successive blocks of "1" respectively surrounding an even number or an odd number of successive "0" are respectively identical or different.

The use of duobinary code for optical transmission was mentioned in an article entitled "10 Gbit/s unrepeatered three-level optical transmission over 100 km of standard fiber" by X. Gu et al., Electronics Letters, Dec. 9, 1993, Vol. 29, No. 25. According to that article, the three levels 0, +, and – correspond respectively to three levels of optical power.

French patent application No. 94 047 32, published under the No. FR-A-2 719 175 also describes duobinary coding applied to an optical system. In that document, binary digit "0" always corresponds to a low level of optical power, while the symbols + and – both correspond to the same high level of optical power, but differ by the phase of the optical carrier being shifted through 180°.

The use of such duobinary code with phase inversion is also mentioned in the article "Optical duobinary transmission system with no receiver sensitivity degradation" by K. Yonenaga et al., Electronics Letters, Feb. 16, 1995, Vol. 31, No. 4.

Although those articles concerning experimentation with that code report an improvement over conventional non-return to zero (NRZ) code, such improvement is not always observed. Thus, when conditions for implementing the code are close to ideal, in particular when using the highest possible extinction ratio, it ought to be observed that improvement is at a maximum. Paradoxically, simulations and tests have given results contrary to those which were expected.

If the physical effects of duobinary code are examined in detail in the context of an optical system, it can be observed that a reduction in the spectrum width of the signal is indeed obtained. However, the code has no influence on the spectrum of each pulse considered in isolation, whereas that is the determining factor concerning the effects of chromatic dispersion.

The positive results mentioned in the various articles are difficult to explain. Although some of the experimental parameters are verifiable (length and quality of the fiber, data rate), other parameters cannot be monitored with precision: characteristics of the optical components and real operation of the electronic monitoring circuits.

After simulations and testing in which the experimental parameters were varied, it turns out that an improvement is obtained providing a phase shift of the carrier wave occurs within each "0" preceding or following each block of "1s" or each isolated "1". The absolute value of the phase shift may be about 180°. Also, it is important to avoid the low level power encoding the "0s" being as small as possible, i.e. to avoid the extinction ratio being as large as possible. In practice, an optimum value for the extinction ratio is a complex function of other experimental parameters. By way of example, it can be selected to be no greater than 20.

It is therefore appropriate to make an emitter device that is capable of applying a phase shift of the order of 180° to the carrier wave within each cell that corresponds to a logic "0", and which precedes or follows any consecutive block of cells corresponding to logic "1" or indeed any isolated cell corresponding to a logic "1".

For this purpose, it is possible to use a laser oscillator coupled to an optical power modulator which is itself coupled to a phase modulator. By applying appropriate electrical control signals to the modulators, the optical power modulator delivers a wave to the phase modulator at an amplitude that is variable and that is carried by the wavelength of the laser, and the phase modulator outputs a wave that is modulated both in power and in phase.

In a variant, it is also possible to use a laser oscillator that is optically coupled to a power modulator. The assembly can be constituted simply by a known type of integrated modulator laser. Unlike the above embodiment, phase modulation is now obtained by acting on the laser injection current. This embodiment makes use of the property of lasers whereby they oscillate at a frequency that varies as a function of injection current. In an optimized embodiment, the laser is designed so that a small variation in current gives rise to sufficient variation in frequency without causing the power of the emitted wave to be subject to significant fluctuation.

Nevertheless, both of those solutions suffer from the drawback of requiring electronic control that is complex and expensive.

In order to simplify control, it is possible to make use of the fact that the phase shift can be performed every time a cell contains a logic "0" and to make use of an interferometer modulator of the "Mach-Zehnder" type. Such a modulator comprises an interferometer structure constituted by an inlet light guide which is subdivided into two branches that are recombined to form an outlet guide. Electrodes are provided for applying respective electric fields across the two branches. When the inlet light guide receives a carrier wave at constant power, two partial waves propagate along the two branches, and then interfere at the outlet. The outlet guide then provides a wave whose power and phase depend on the values of the electric voltages applied to the electrodes. To create a wave that is modulated in power and in phase, a voltage is applied to at least one of the electrodes, which voltage is amplitude modulated in a manner that corresponds to the binary signal to be emitted.

Since the phase changes need to take place at instants when the power of the emitted wave has a minimum value, it is appropriate to bias the electrodes so that in the absence of modulation, the DC components of the applied electrical voltages are such that the interference between the two partial waves is as destructive as possible. If the modulator has two identical branches, this condition implies that the DC components should be different.

The modulator can be made on a substrate of lithium niobate $LiNbO_3$. Nevertheless, modulators on $LiNbO_3$ are not suitable for integration, they are expensive, and they age poorly. It is possible to envisage using an interferometer modulator having the same configuration but made on a substrate of III–V elements, such as indium phosphide (InP). Nevertheless, that transposition is unsatisfactory since, unlike lithium niobate, attenuation in the guides due to the non-linear electro-optical effects in the III–V elements is highly dependent on the applied voltage.

OBJECTS AND SUMMARY OF THE INVENTION

Thus, an object of the invention is to propose an optical data emitter device that does not have the drawbacks of the above solutions.

More precisely, the invention provides a device for emitting binary data in the form of a light wave that is modulated in power and in phase, the device comprising:

an interferometer structure of the Mach-Zehnder type in which an inlet light guide suitable for receiving an inlet light wave is split into two branches for guiding two partial waves, said two branches recombining to form an outlet guide, electrodes being provided to apply respective electric fields across said two branches; and a control circuit for applying said electric fields as a function of an input electrical signal modulated between a high voltage level and a low voltage level, and representative of the binary data to be emitted;

wherein said interferometer structure is of the p-i-n type made on a substrate of III–V elements, wherein said two branches are dimensioned so that in the absence of an applied electric field said two partial waves interfere destructively, and wherein said control circuit is designed to apply respective control voltages to the electrodes with DC components that are substantially equal, at least one of said control voltages being the result of superposing a bias on a filtered signal obtained by lowpass filtering said input electrical signal.

Because of the choice of an interferometer structure that is "antisymmetrical" together with appropriate control, the mean voltages applied to the electrodes are reduced, thereby making it possible to reduce attenuation and to position the phase changes relative to the light power passing through zero.

In a variant which makes it possible, for given extinction ratio, to further reduce the mean voltages applied to the electrodes, wherein said control voltages are the result respectively of superposing bias voltages on filtered signals obtained by lowpass filtering said input electrical signal and a complementary input electrical signal modulated between a low level and a high level of voltage and representative of complementary values of said binary data to be emitted.

In order to compensate for possible manufacturing imperfections in the antisymmetrical modulator, it is advantageous to provide for the values of said bias voltages to be selected so that the interference of said two partial waves is as destructive as possible when said DC components are applied to said electrodes.

BRIEF DESCRIPTION OF THE DRAWINGS

Other aspects and advantages of the invention appear from the description below given with reference to the figures, in which:

FIGS. 3 and 4 are characteristic curves of a modulator of conventional configuration on InP;

FIGS. 5 and 6 are characteristic curves of a modulator of antisymmetrical type on InP when only one electrode is powered;

MORE DETAILED DESCRIPTION

Figure 1:
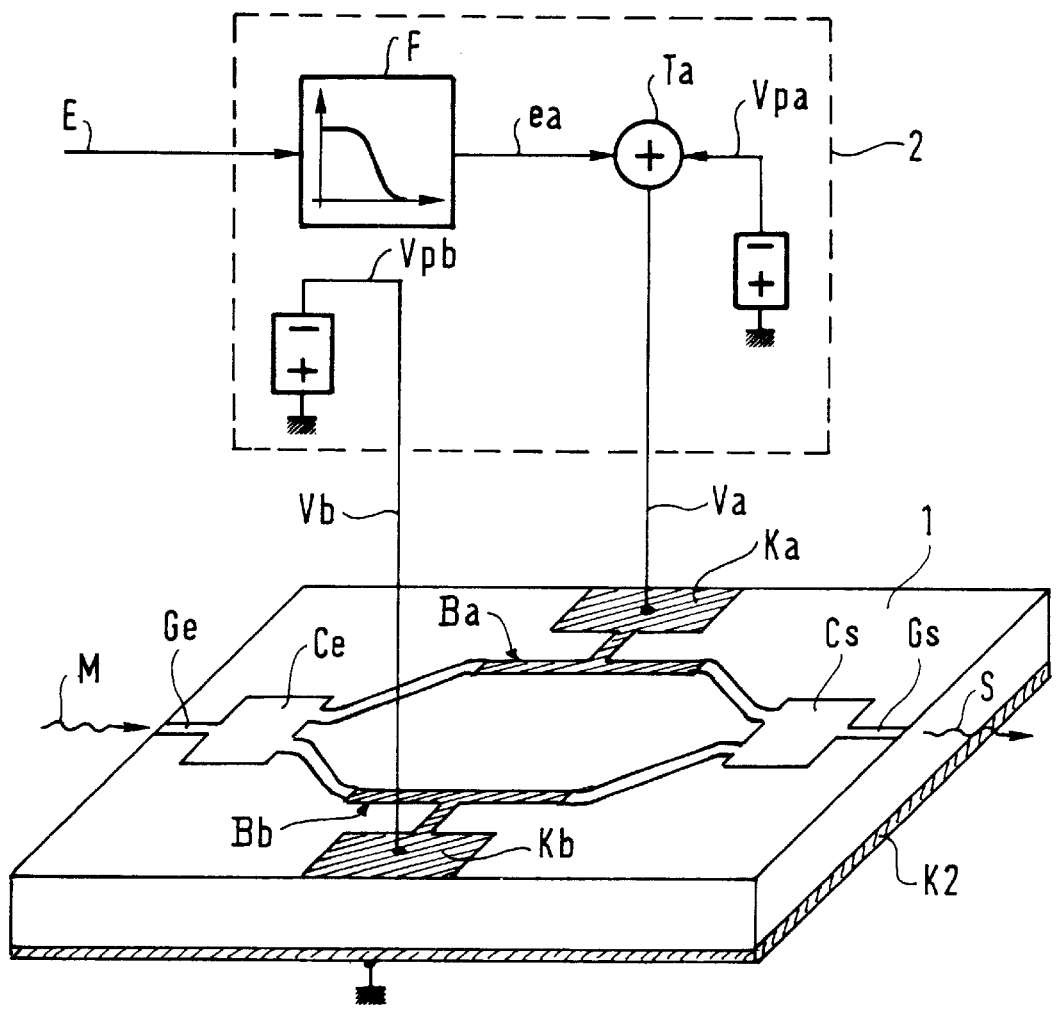
FIG. 1 shows an emitter device of the invention.

FIG. 1 shows a first embodiment of an emitter device of the invention. The device is essentially constituted by a Mach-Zehnder type modulator 1 and an electronic control circuit 2. The modulator 1 is made on a substrate of III–V elements, such as indium phosphide, InP. It includes an inlet light guide Ge which is split via an inlet coupler Ce into two branches Ba and Bb. The two branches Ba and Bb reunite at an outlet coupler Cs to form an outlet guide Gs. Electrodes Ka and Kb placed on the branches Ba and Bb are designed to receive respective voltages Va and Vb from the control circuit 2. A third electrode K2 is placed on the bottom face of the modulator 1 and is connected to ground.

The inlet guide Ge receives a continuous wave M delivered by a laser oscillator (not shown). The outlet wave S is delivered by the outlet guide Gs.

Figure 2:
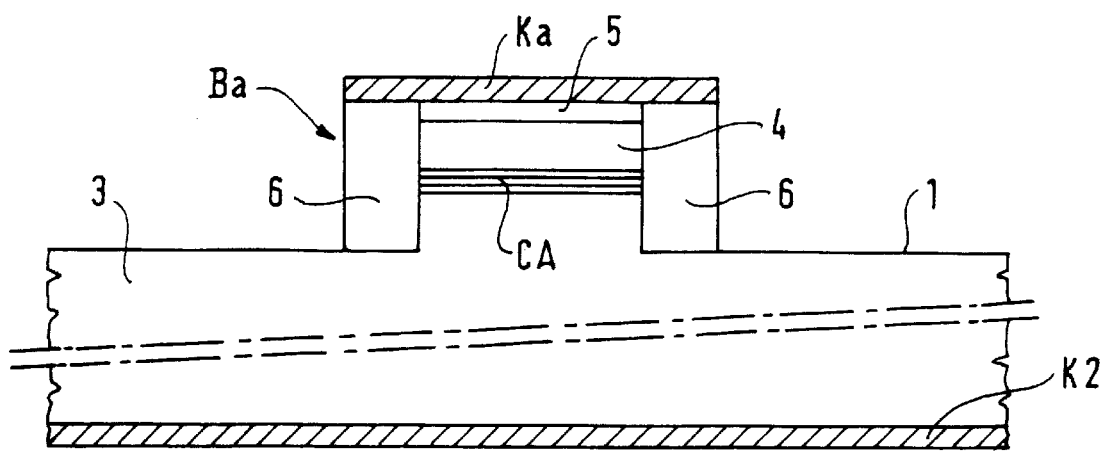
FIG. 2 is a section through a portion of a modulator that can be used for implementing the invention.

FIG. 2 is a section view through the modulator 1 through the branch Ba and shows its internal structure in greater detail. The modulator 1 is formed on an n-doped InP substrate on which there has been formed in succession an active layer CA, a p-doped InP layer 4, and a contact layer 5. The sides of the top face of the component are subsequently etched so as to make a ridge structure. Thereafter lateral insulating layers 6 of polyimide are deposited followed by top and bottom electrodes Ka and K2. The active layer CA may have a quantum well structure, for example.

For a given wavelength of the inlet light wave M, the modulator of the invention is designed so that the partial waves conveyed by the branches Ba and Bb interfere destructively when no voltage is applied to the top electrodes. This result can be achieved by making the branches of different lengths so as to present an optical path length difference equal to half the wavelength of the inlet light wave M.

For example, for an inlet wavelength of 1.56 µm, with an active layer on InP having a characteristic wavelength of 1.45 µm, the desired optical path length difference is obtained by making waveguides that have a difference in length of 0.24 µm. The electrodes over the branches Ba and Bb should then be of equal length, e.g. 600 µm.

The control circuit 2 receives an electrical input signal E of the NRZ type and it supplies the electrodes Ka and Kb with respective control voltages Va and Vb. In the example shown, the voltage Vb is a fixed bias voltage Vpb which is negative relative to ground. The voltage Va is obtained by superposing a negative bias voltage Vpa and a modulation signal ea obtained by filtering the electrical input signal E at F.

In order to understand the operation of the FIG. 1 device, it is appropriate to begin with some explanation concerning the operation of interferometer modulators made on an III–V element substrate such as InP.

FIGS. 3 and 4 are characteristic curves for a symmetrical interferometer made on InP. These curves correspond to the case where the electrode Kb is grounded. As shown in FIG. 3, the output light power Ps varies as a function of the negative voltage Va applied to the electrode Ka, and has a maximum when Va=0 and a minimum for a particular negative value V1. Above that value, the power Ps increases again up to another maximum value. This second maximum value is lower than that obtained when Va=0 because of the voltage-dependent attenuation. FIG. 4 shows the corresponding phase variations Δφ in the output light wave, and a phase shift Δφ1 of less than 180° can be observed in the vicinity of the voltage V1. It can also be observed that in the vicinity of this phase difference, Δφ varies slowly as a function of Va and the power Ps is not zero when Va=V1.

To achieve the desired modulation with a symmetrical modulator, it would thus be appropriate to bias the electrode Ka so that the voltage Va can vary in the vicinity of V1. Unfortunately, given these characteristic curves, this gives rise to a small extinction ratio and to the phase shift being inaccurately positioned relative to the point at which the light power is at a minimum. This drawback cannot be compensated by acting on the bias voltage applied to the electrode Kb since this voltage must remain negative.

FIGS. 5 and 6 show the same characteristic curves for an antisymmetrical modulator on InP, still for the case where the electrode Kb is grounded. The optical power Ps is then zero when Va=0 and is at a maximum for a negative value V0. A phase shift of 180° takes place when Va is close to 0.

Figure 7:
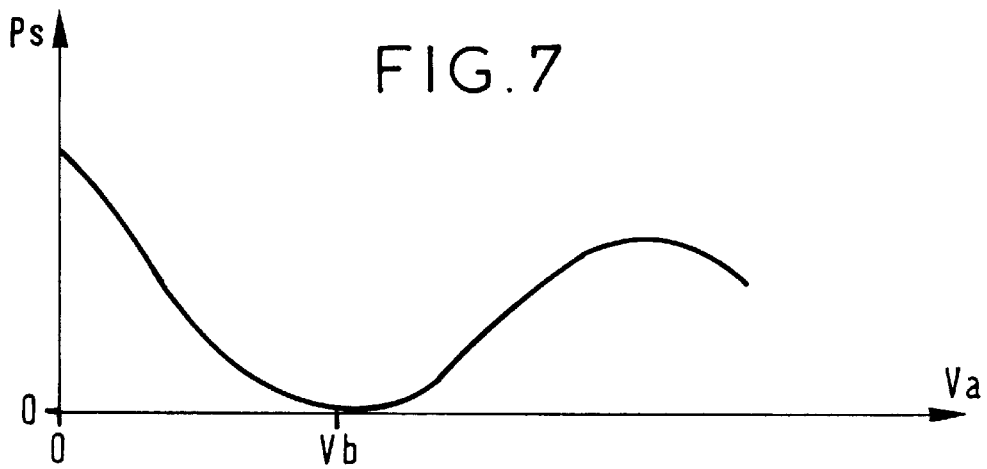
FIGS. 7 and 8 are further characteristic curves of an antisymmetrical modulator when both electrodes are powered.
Figure 8:
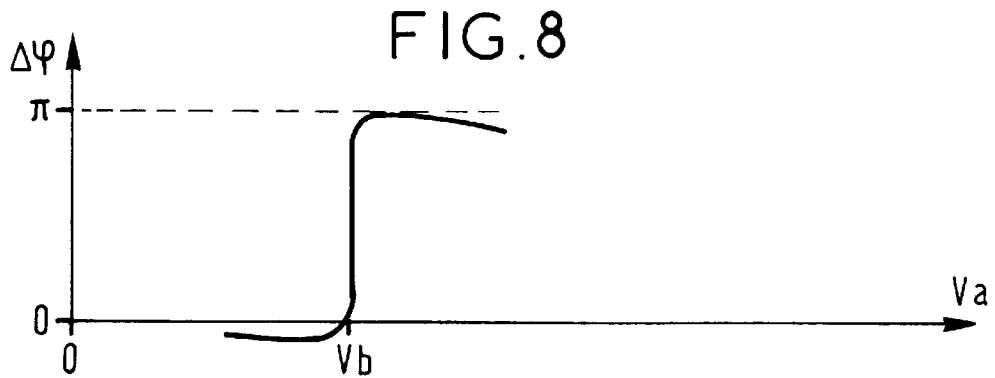

Now, if a negative voltage Vb is applied to the electrode Kb, then characteristic curves are obtained as shown in FIGS. 7 and 8. In this case, when Va varies in the vicinity of Vb, the light power Ps passes through 0 and the phase shift Δφ passes quickly through 180°. Thus, by modulating Va in the vicinity of Vb, it is possible to achieve power and phase modulation of the outlet wave such that phase shifts Δφ of 180° take place accurately at those instants when the light power Ps passes through 0. Also, because the mean voltages applied to the electrodes are smaller in absolute value than in the case of a symmetrical modulator, the power attenuation at the outlet is smaller.

Figure 9:
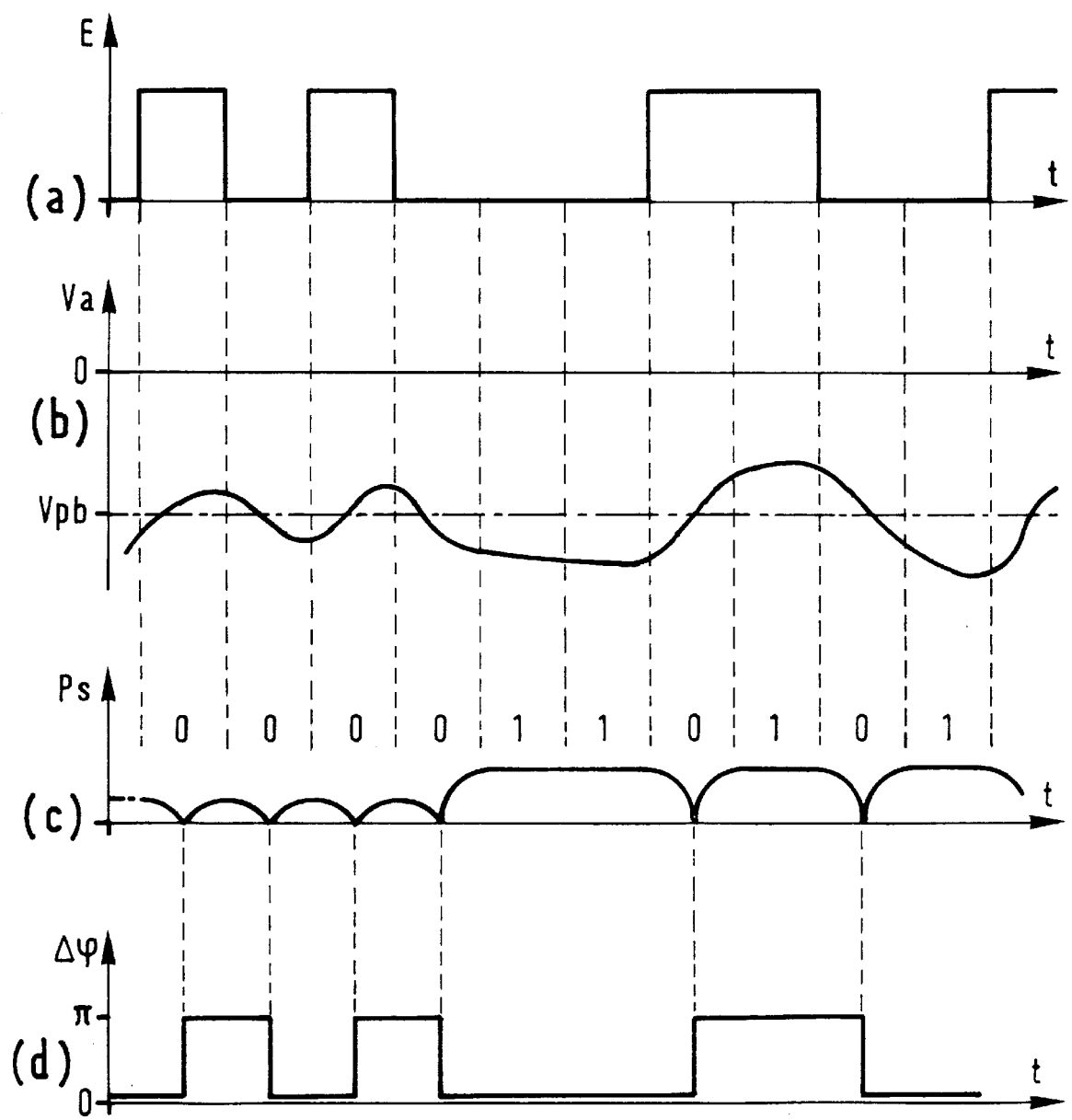
FIG. 9 is a timing chart for explaining the operation of the emitter device of the invention.

The operation of the device of FIG. 1 is described below with reference to the timing chart of FIG. 9. Waveform (a) shows an example of an NRZ type electrical input signal E. The signal E is applied to the input of a lowpass filter F which supplies the filtered signal ea. The signal ea is superposed in analog adder Ta on a bias voltage Vpa to provide the control voltage Va for the electrode Ka. Variations in the voltage Va are shown in waveform (b). The bias voltage Vpa is adjusted so that the DC component of the voltage Va is equal to the fixed bias voltage Vpb applied to the electrode Kb. The corresponding variations in the outlet light power Ps and in its phase Δφ are shown respectively in waveforms (c) and (d). It can be seen that the wave presents a phase shift of 180° substantially in the middle of each time cell that represents a binary "0" (low mean optical power), whereas no phase shift occurs in time cells representing logic "1" (high mean optical power).

Figure 10:
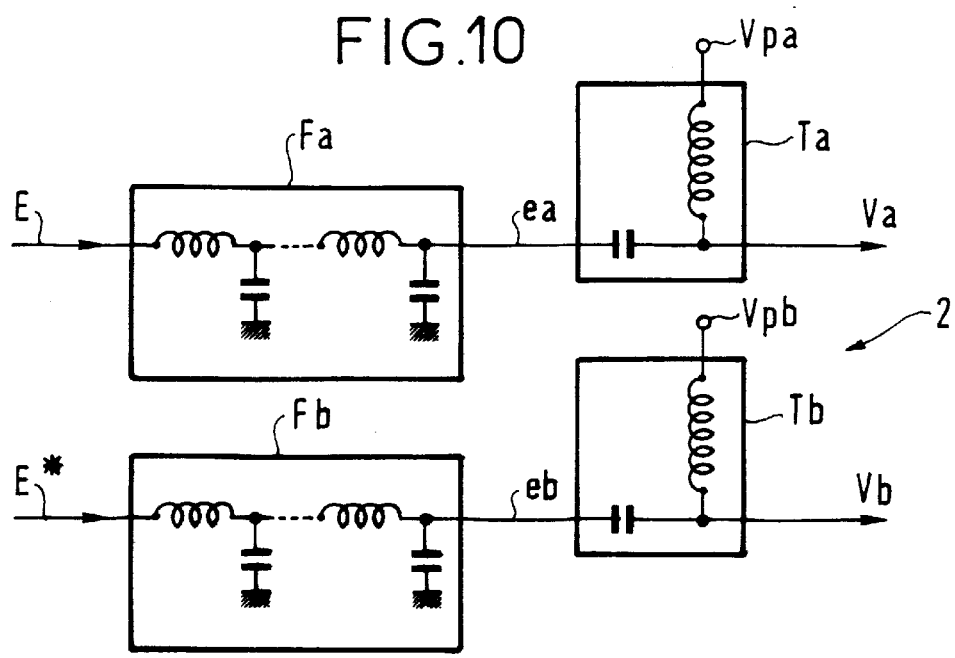
FIG. 10 shows a variant embodiment of a control circuit for the emitter device of the invention.

In a variant embodiment of the control circuit 2, it is possible to apply a voltage Vb to the electrode Kb which is modulated in phase opposition relative to the voltage Va. For this purpose, it is possible to use the circuit shown in FIG. 10 where the input electrical signal E and its complement E* are applied respectively to the inputs of two lowpass filters Fa and Fb. The filters Fa and Fb supply respective filtered signals ea and eb which are superposed on the bias voltages Vpa and Vpb by means of analog adders Ta and Tb.

In principle, the bias voltages Vpa and Vpb are adjusted so that the DC components of the voltages Va and Vb are equal. Nevertheless, in order to compensate for possible manufacturing dispersion in the modulator, the bias voltages Vpa and Vpb will in practice be adjusted so as to ensure the most destructive interference possible takes place in the absence of input signal modulation, i.e. when only the DC components of the voltages Va and Vb are applied to the electrodes.

In the special case where the filtered signals ea and eb do not have DC components, the bias voltages Vpa and Vpb are respectively the DC components of the voltages Va and Vb and are, in principle, equal.

Advantageously, the lowpass filters Fa and Fb are selected to present a passband, expressed in hertz, that is about 0.28 times the data rate, expressed in bits per second of the binary data E to be emitted. Also, it is preferable to use a filter having linear phase, such as a Bessel filter. Finally, to ensure appropriate ripple in the optical power within time cells representing logical "0", a Bessel filter of order 5 is suitable.

We claim:

1. A device for emitting binary data in the form of a light wave that is modulated in power and in phase, the device comprising:

an interferometer structure of the Mach-Zehnder type in which an inlet light guide, suitable for receiving an inlet light wave, is split into two branches for guiding two partial waves, said two branches recombining to form an outlet guide, electrodes being provided to apply respective electric fields across said two branches; and a control circuit for applying said electric fields as a function of an input electrical signal modulated between a high voltage level and a low voltage level, and representative of the binary data to be emitted;

wherein said interferometer structure is of the p-i-n type made on a substrate of III–V elements, wherein said two branches are dimensioned so that in the absence of an applied electric field said two partial waves interfere destructively, wherein said control circuit is designed to apply respective control voltages to the electrodes with DC components that are substantially equal, at least one of said control voltages being the result of superposing a bias on a filtered signal obtained by lowpass filtering said input electrical signal and wherein phase changes of an emitted light wave occur when a power of the emitted light wave is at a minimum value.

2. An emitter device according to claim 1, wherein said control voltages are the result respectively of superposing bias voltages on filtered signals obtained by lowpass filtering said input electrical signal and a complementary input electrical signal modulated between a low level and a high level of voltage and representative of complementary values of said binary data to be emitted.

3. An emitter device according to claim 1, wherein, to perform said lowpass filtering, said control circuit includes at least one electronic filter of passband, expressed in hertz, that is about 0.28 times the data rate, expressed in bits per second, of said binary data to be emitted.

4. An emitter device according to claim 3, wherein said electronic filter is a Bessel filter.

5. An emitter device according to claim 4, wherein said electronic filter is a Bessel filter of order 5.

6. An emitter device according to claim 1, wherein the values of said bias voltages are selected so that the interference between said two partial waves is as destructive as possible when said DC components are applied to said electrodes.

7. An emitter device according to claim 1, wherein said branches are dimensioned to have an optical path length difference equal to half the wavelength of the inlet light wave.

8. An emitter device according to claim 1, wherein said branches include light guides having the same structure and different lengths.

* * * * *